US 8,180,154 B2

United States Patent
Collier et al.

(12) United States Patent (10) Patent No.: US 8,180,154 B2
Collier et al. (45) Date of Patent: May 15, 2012

(54) METHOD AND APPARATUS FOR REGION-BASED SEGMENTATION IMAGE PROCESSING USING REGION MAPPING

(75) Inventors: Jarrell D. Collier, Sherman Oaks, CA (US); Michael P. Davenport, Camarillo, CA (US); H. K. John Armenian, Los Angeles, CA (US)

(73) Assignee: Techfinity, Inc., Calabasas, CA (US)

( * ) Notice: Subject to any disclaimer, the term of this patent is extended or adjusted under 35 U.S.C. 154(b) by 995 days.

(21) Appl. No.: 12/055,217

(22) Filed: Mar. 25, 2008

(65) Prior Publication Data

US 2009/0245638 A1 Oct. 1, 2009

(51) Int. Cl.
*G06K 9/34* (2006.01)
*G06K 9/00* (2006.01)

(52) U.S. Cl. ........ 382/180; 382/103; 382/128; 382/173; 382/181; 382/194; 382/256; 382/257

(58) Field of Classification Search ............... 382/180, 382/103, 128, 173, 181, 194, 256, 257
See application file for complete search history.

(56) References Cited

U.S. PATENT DOCUMENTS

| | | | | |
|---|---|---|---|---|
| 7,031,517 | B1* | 4/2006 | Le et al. | 382/173 |
| 7,376,266 | B2* | 5/2008 | Simard et al. | 382/166 |
| 7,400,767 | B2* | 7/2008 | Slabaugh et al. | 382/173 |
| 7,889,941 | B2* | 2/2011 | Piovano et al. | 382/260 |
| 2005/0171409 | A1* | 8/2005 | Arimura et al. | 600/300 |
| 2007/0154110 | A1* | 7/2007 | Wen et al. | 382/276 |
| 2008/0101678 | A1* | 5/2008 | Suliga et al. | 382/132 |

OTHER PUBLICATIONS

Boykov, et al. "Fast Approximate Energy Minimization via Graph Cuts." IEEE Transactions on Pattern Analysis and Machine Intelligence. 23.11 (2001): 1222-1239. Print.*
Shi, et al. "Normalized Cuts and Image Segmentation." IEEE Transactions on Pattern Analysis and Machine Intelligence. 22.8 (2000): 888-905. Print.*
Sekuler, et al. "Generalized Common Fate: Grouping by Common Luminance Changes." Psychological Science. 12.6 (2001): 437-444. Print.*
Brox, et al. "Multi-Stage Region Merging for Image Segmentation." 22nd Symposium on Information Theory in the Benelux. (2001): 189-196. Print.*
Lakshmanan, V. (2001). A hierarchical, multiscale texture segmentation algorithm for real-world scenes. Informally published manuscript, Graduate College, University of Oklahoma, Norman, Oklahoma. Retrieved from http://proquest.umi.com/pqdlink?Ver=1 &Exp=05-31-2016&FMT=7&DID=726039951&RQT=309 &attempt=1.*

(Continued)

*Primary Examiner* — Michael A Newman
(74) *Attorney, Agent, or Firm* — Arent Fox, LLP

(57) ABSTRACT

Object detection in an image using an image processing approach in which the image is updated based on an energy function. In one aspect, the exemplary image update process attempts to homogenize each region by associating each pixel with a particular region such that the total level of energy for the image based on the pixel located in that region is minimized with respect to the energy function. For example, the method of object detection in an image having a plurality of pixels by image segmentation includes dividing the image into a plurality of regions; assigning each pixel to one of the plurality of regions based on a characteristic; performing an energy reduction on the image based on a region reassignment of at least one pixel; and producing an output image based on the energy reduction.

25 Claims, 8 Drawing Sheets

OTHER PUBLICATIONS

Cook, et al. "Segmentation and Simulated Annealing." in Proc. EUROPTO (Sicily), Microwave Sensing and Synthetic Aperture Radar. (1996): 30-37. Print.*

Corso, et al. "Segmentation of Sub-Cortical Structures by the Graph-Shifts Algorithm." Proc. of Information Processing in Medical Imaging. (2007): 183-197. Print.*

* cited by examiner

METHOD AND APPARATUS FOR REGION-BASED SEGMENTATION IMAGE PROCESSING USING REGION MAPPING

STATEMENT REGARDING FEDERALLY SPONSORED RESEARCH OR DEVELOPMENT

This invention was made with Government support under HQ0006-05-C-7263 awarded by the Missile Defense Agency. The Government has certain rights in the invention.

BACKGROUND

I. Field

The following description relates generally to image processing, and more particularly to a method and apparatus for region-based segmentation image processing using region mapping.

II. Background

Image processing includes techniques for analyzing image-based data to achieve some objective. The data may generally be represented by variations of intensity or color within a two-dimensional array. Important applications of image processing include object and feature detection. In these applications, some subset of image elements (pixels), taken together, may represent one or more features or physical objects within a scene or background captured by the image. Objects within an image may be detected by identifying a boundary or edge around the object.

Edge detection models have conventionally been used to determine the objects' boundaries. Edge detection is a technique for identifying areas in an image where the intensity changes sharply. Edges of an object or feature are presumed to exist in locations where steep intensity gradients are present. Edge techniques typically perform poorly, however, when the image characteristics do not provide a regular pattern of sharp contrasts between neighboring pixels such that edges of potential objects or features are not well defined. The absence of such patterns may occur, for example, when an object's edges are unclear or are blurred by image noise.

Alternative approaches to edge detection include region-based techniques that identify objects regardless of the presence or absence of clear edges. One such example includes the active contour without edges (ACWE) method. In these approaches, regions may be grouped according to one or more common image characteristics. Objects or features may be detected based on the use of the characteristics to calculate regions to which the image's pixels may be grouped. Unlike edge detection approaches, region-based techniques are not constrained to relying on image gradients to detect objects.

Unfortunately, current region-based approaches are computationally inefficient—and hence unduly time and resource intensive. In addition, many these approaches use pre-existing hard-coded techniques that fail to adapt to the images to be processed, rendering the approaches imprecise, and often producing unpredictable results.

Accordingly, a need in the art exists for systems and/or methodologies that achieve better performance for image processing, including processing for object detection.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide object detection in an image having a plurality of pixels by image segmentation. In one aspect, a method includes dividing the image into a plurality of regions; assigning each pixel to one of the plurality of regions based on a characteristic; performing an energy reduction on the image based on a region reassignment of at least one pixel; and producing an output image based on the energy reduction.

In another aspect, an apparatus provides object detection in an image having a plurality of pixels by image segmentation. The apparatus includes means for dividing the image into a plurality of regions; means for assigning each pixel to one of the plurality of regions based on a characteristic; means for performing an energy reduction on the image based on a region reassignment of at least one pixel; and means for producing an output image based on the energy reduction.

In another aspect, a computer program product provides object detection in an image having a plurality of pixels by image segmentation. The computer readable medium includes codes executable to divide the image into a plurality of regions; assign each pixel to one of the plurality of regions based on a characteristic; perform an energy reduction on the image based on a region reassignment of at least one pixel; and produce an output image based on the energy reduction.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The fast region-based segmentation approach as described in the present disclosure provides a superior alternative to conventional approaches, including, for example, the active contour without edges (ACWE) method. Thus, to provide some context for the discussion of the region-based segmentation approach, the ACWE method will be initially described.

Figure 1:
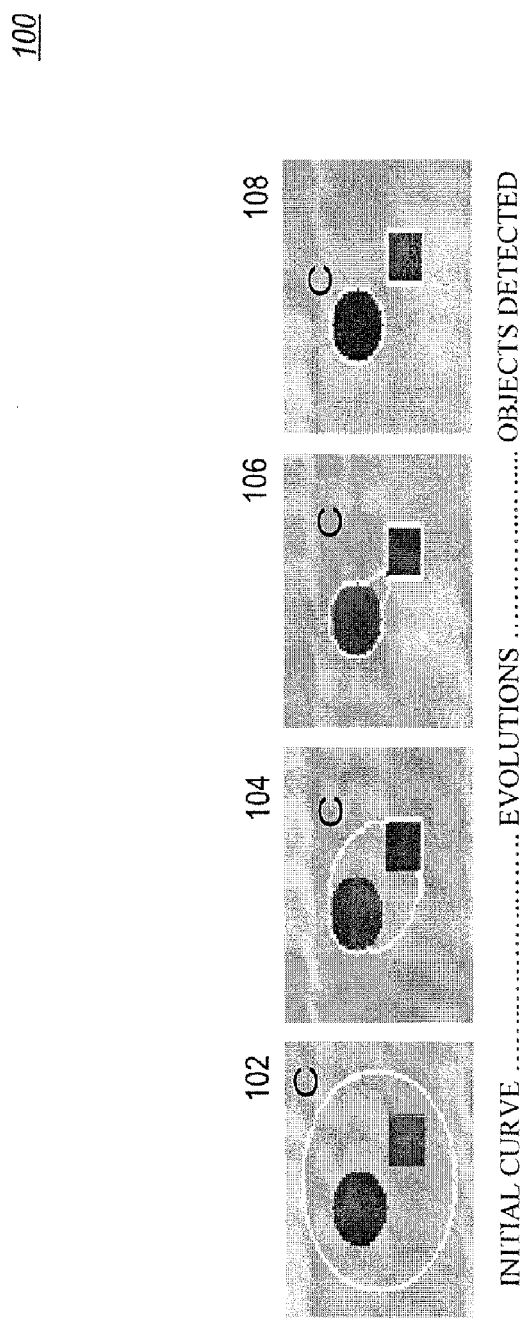
FIG. 1 is a diagram illustrating the evolution of image segmentation using an Active Contours without Edges (ACWE) segmentation approach for two regions using a single contour.

Generally, the ACWE method evolves an initial contour to find the desired objects. FIG. 1 contains a series 100 of images 102, 104, 106 and 108 illustrating the evolution of an initial contour C (image 102) using the ACWE method to fit a set of objects (image 108), including two intermediate stages (images 104 and 106). Unlike the prior edge detection approaches, the ACWE method is able to process images without requiring contrast enhancement or noise reduction operations—both of which could affect the original acquired information from the image data. For example, a noise smoothing operation may undesirably change the location of features to be extracted as the original captured image is changed during the image processing sequence. Thus, operations that will affect the original image data are preferably avoided. Further, any additional image processing operations also undesirably adds to the image processing complexity.

Figure 2:
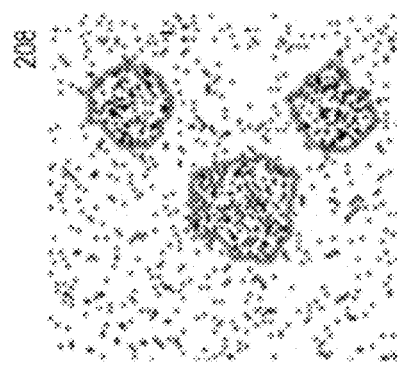
FIG. 2 is an exemplary image illustrating the segmentation of a sample image not having any clear edges using the ACWE segmentation approach for two regions using a single contour.
Figure 2:
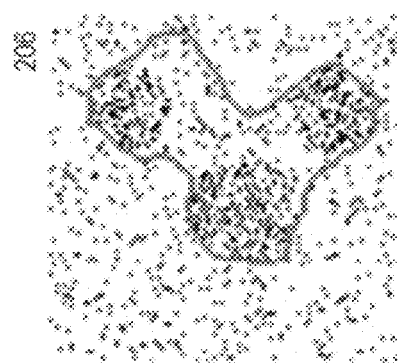
Figure 2:
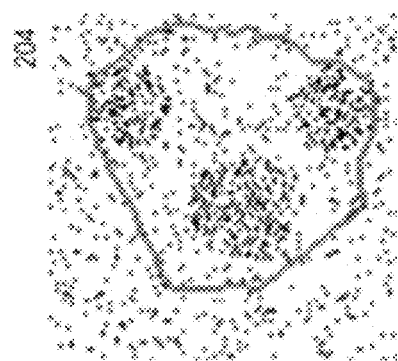
Figure 2:
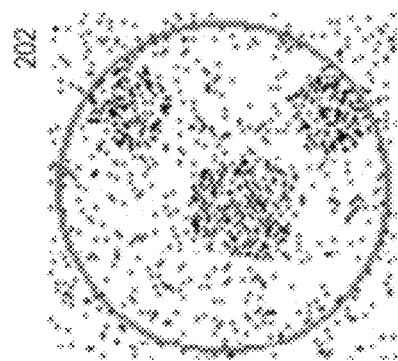

The ACWE method evolves a contour C to detect objects in an original image $u_0$. This evolution is achieved by minimizing the following functional F with respect to the contour C:

$$\inf_C F(C) = \int_C J(u_0)dx + R,$$

where the regularization term R takes into consideration the perimeter or area of the variable curve C. This provides for a smooth contour so that noise is not included in the analysis.

$$\int_C J(u_0)dx$$

is the fitting term, which ensures the contour evolves to fit the object in the image. Usually, in a non-ACWE method, an edge detector function, which gives a boundary of the object would be used for $J(u_0)$. However, in the ACWE method, a function that finds complete regions of the objects is used. The fitting term for a single contour is defined as follows:

$$\int_C J(u_0)dx = \int_{inside(C)} |u_0 - c_1|^2 dxdy + \int_{outside(C)} |u_0 - c_2|^2 dxdy.$$

where, $c_1$ = average$(u_0)$ inside $C$, and $c_2$ = average$(u_0)$ outside $C$ As illustrated in a series 200 of images 202, 204, 206 and 208 in FIG. 2, the method works without gradients, thus whole regions can be found even though they may not have clear edges. Also there is no need for noise filtering or other image processing operations that may blur the image and location of edges of objects. In the example of FIG. 2, the edges are grainy and not well defined in part because the illustrated pixels are only one of two intensities (on or off) and because the pixels along the perimeter of one of the tree shapes (see image 208) are typically not in contact or otherwise adjacent one another. In such a case, no sharply defined gradients exist in any continuous direction to demarcate a clear perimeter, and conventional edge detection techniques may fail. Because ACWE is a regional-based approach, the three shapes of image 208 can still be detected from the single curve of image 202.

The ACWE method provides multi-contour capabilities. The method can be extended to have several initial contours that detect objects of different intensities. The basic ACWE method segments an image into two regions using a single contour. For example, an extension to two contours $C_1$ and $C_2$ will yield four possible feature regions: region $A_1$ inside both $C_1$ and $C_2$, region $A_2$ inside $C_1$ but not $C_2$, region $A_3$ inside $C_2$ but not $C_1$, and region $A_4$ inside neither $C_1$ nor $C_2$. In general, an extension to m contours will yield n=$2^m$ regions.

The functional for this type of image segmentation has the following form:

$$F(c, \varphi) = \int_{A_1} |u - c_1|^2 + \int_{A_2} |u - c_2|^2 + \int_{A_3} |u - c_3|^2 + \int_{A_4} |u - c_4|^2 + R \quad (1.1)$$

where c=$(c_1, c_2, c_3, c_4)$ is a vector of real numbers, $\phi=(\phi_1,\phi_2)$ is a pair of functions defined on the image whose zero-level sets determine the contours $C_1$ and $C_2$, u is the image intensity function, and R is a regularization term. The functions $\phi_1$ and $\phi_2$ are often chosen to be the distance from a pixel to the corresponding contour; positive inside the contour and negative outside the contour. The regularization term R is typically the length of the contours.

Figure 3:
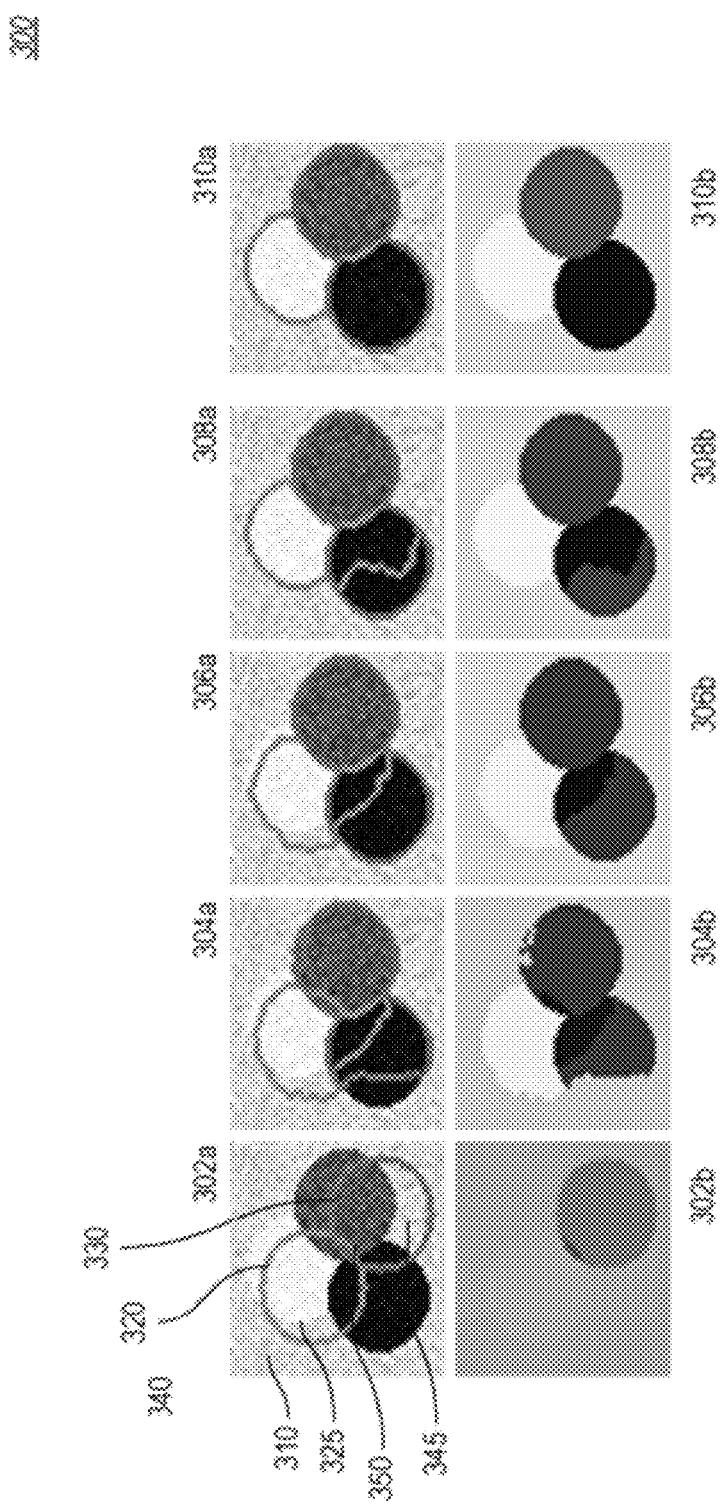
FIG. 3 is an exemplary image illustrating image segmentation of more than two regions using the ACWE segmentation approach using multiple contours.

Choosing c and $\phi$ to minimize this functional determines a piecewise constant approximation to the image: the approximation has intensity $c_1$ on region $A_1$, intensity $c_2$ on region $A_2$, and so on. The integral terms in the functional determine how well the approximation determined by candidates c and $\phi$ fits the image. The regularization term forces the contours to be smoother. An example is illustrated in FIG. 3, where a group 300 of images includes a set of images 302a, 304a, 306a, 308a, and 310a illustrating the evolution of two contours 320 and 330 on an image to detect four regions: a region 350 inside both contours 320 and 330, a region 310 outside both contours 320 and 330, a region 325 inside the contour 320 and outside the contour 330, and a region 345 outside the contour 320 and inside the contour 330). A second set of corresponding images 302b, 304b, 306b, 308b, and 310b illustrates the evolution of a corresponding approximation image, which shows the identified regions and the eventual smoothing of the region edges. Thus, the approximation image shown in 310b is generated using equation (1.1), above.

A description of an exemplary process implementing the ACWE method follows. The implementation accepts an original image $u_0$ and returns a processed image $u_1$. Both images are arrays with a known number of rows and columns. Each entry is the intensity of the pixel at the given row and column.

Further, in the implementation, a number of contours, from 1 to 3, are manually selected. The number of contours determines the number of regions; for example, if the number of contours is 3 then the number of regions is $2^3=8$. The contours, and therefore the regions, are determined by the particular ACWE process being implemented. The processed image is an approximation to the original image, in which the intensity is constant in each region.

In one illustrative scenario, the implemented ACWE process maintains the following arrays:
phi,
phiByContourRegion,
regionCount, and
regionAverage,
where the array phi is indexed by contour, row, and column. Each entry is assigned a value of +1 or −1, depending on whether the pixel at the given row and column is inside the given contour or not. The array phiByContourRegion is indexed by contour and region. Each entry is assigned a value of +1 or −1, depending on whether the pixels in the given region are inside the given contour or not (the pixels in a region are either all inside a contour or all not inside). The array regionCount is indexed by region. Each entry is the number of pixels in the given region. The array regionAverage is indexed by region. Each entry is the average intensity of the original image in the region.

In this illustration, the implemented ACWE process has three major processing steps: initialization, energy reduction, and processed image generation.

The initialization step initializes the four arrays. The array phi can be initialized by one of several methods, selected by the user. Each method specifies a hard-coded set of contours, or equivalently, a hard-coded set of regions, from which phi is initialized. The other arrays are initialized using the information in phi.

The energy reduction step performs a number of energy reduction iterations specified by the user, typically three. On each iteration, the implementation modifies the contours and regions by changing the array phi in order to reduce the value of an objective function. After phi has been modified the other arrays are updated accordingly.

The energy reduction step of the ACWE process uses an energy function, which includes two terms: a fit term and a length term. Suppose that a pixel in row r and column c is currently in region curRegion. The change in energy for redefining the regions so that the pixel belongs to a new region, newRegion, is the weighted sum of the changes in the two terms:

$$deltaEnergy = deltaFit + (w*deltaLength)$$

The weight coefficient w is specified by the user. The change in the fit term is:

$$deltaFit = sqr(u0[r][c] - regionAverage[newRegion]) *$$
$$regionCount[newRegion] / (regionCount[newRegion] + 1) -$$
$$sqr(u0[r][c] - regionAverage[curRegion]) *$$
$$regionCount[curRegion] / (regionCount[curRegion] - 1)$$

where sqr( ) is a squaring function. Note that the deltaFit function involves squares of deviations from region averages and ratios of region counts. The change in the length term deltaLength depends on the number of contours. For example, for three contours it is:

$$deltaLength = sqrt(sqr((phi[0][r+1][c] - phiNew0)) +$$
$$sqr((phi[0][r-1][c] - phiNew0)) +$$
$$sqr((phi[0][r][c+1] - phiNew0)) +$$
$$sqr((phi[0][r][c-1] - phiNew0)) +$$
$$sqr((phi[1][r+1][c] - phiNew1)) +$$
$$sqr((phi[1][r-1][c] - phiNew1)) +$$
$$sqr((phi[1][r][c+1] - phiNew1)) +$$
$$sqr((phi[1][r][c-1] - phiNew1)) +$$
$$sqr((phi[2][r+1][c] - phiNew2)) +$$
$$sqr((phi[2][r-1][c] - phiNew2)) +$$
$$sqr((phi[2][r][c+1] - phiNew2)) +$$
$$sqr((phi[2][r][c+1] - phiNew2))) =$$
$$-sqrt(sqr((phi[0][r+1][c] - phiCur0)) +$$
$$sqr((phi[0][r-1][c] - phiCur0)) +$$
$$sqr((phi[0][r][c+1] - phiCur0)) +$$
$$sqr((phi[0][r][c-1] - phiCur0)) +$$
$$sqr((phi[1][r+1][c] - phiCur1)) +$$
$$sqr((phi[1][r-1][c] - phiCur1)) +$$
$$sqr((phi[1][r][c+1] - phiCur1)) +$$
$$sqr((phi[1][r][c-1] - phiCur1)) +$$
$$sqr((phi[2][r+1][c] - phiCur2)) +$$
$$sqr((phi[2][r-1][c] - phiCur2)) +$$
$$sqr((phi[2][r][c+1] - phiCur2)) +$$
$$sqr((phi[2][r][c-1] - phiCur2)))$$

where:
sqrt( ) is a square root function, sqr( ) is a square function,
phiCur0=phi [0] [r] [c],
phiCur1=phi [1] [r] [c], and
phiCur2=phi [2] [r] [c].

Further, phiNew0, phiNew1, and phiNew2 are what the corresponding values would be if phi were modified so that the pixel belonged to newRegion instead of curRegion. From the above calculation set, it can be observed that deltaLength involves the square roots of sums of squares of terms involving each contour.

Finally, the processed image generation step uses phi and regionAverage to construct the approximation image.

The implemented ACWE process has several significant problems, which increase both computing resource requirements and process execution time. For example, while the use of contours may provide one possible means of visualizing the segmentation process, it is not necessary to generate the region mapping, it is computationally redundant, and it unduly complicates and prolongs processing. In addition, the implemented ACWE process does not adapt the initialization of the contours and regions to the original image; rather, it uses one of several hard-coded techniques. These hard-coded techniques represent an arbitrary initialization approach (i.e. selection of an initial contour or region), which has no sensible relationship to the objects in the image that are ultimately identified. The drawback is that more iterations (translating to more computational time) may be required to reach an acceptable segmentation of the image. Furthermore, the published ACWE process does not include any suggestion or rationale for performing a smarter or image-specific initialization of contours or regions. While the ability to use an arbitrary initialization can be viewed as an advantage in terms of the robustness of the process, it nonetheless may impact adversely on the computation time.

The implemented ACWE process also requires repeated calculations that could be avoided. For example, the region that each pixel belongs to is determined on each iteration, even though that information was previously known and could have been saved. Similarly, it repeatedly calculates whether a region is inside a particular contour, even though that relationship is invariant under changes to the contours and regions. Various additional shortcomings and problems in the implemented ACWE approach will be appreciated by those skilled in the art, and are addressed in connection with aspects of the present disclosure.

The various approaches described herein embody a superior approach to an algorithm for image segmentation for detecting objects and features in images. According to one aspect, the implementation accepts an origin image $u_0$ and returns a processed image $u_1$. Both images may include arrays with a known number of rows and columns, although different configurations using alternative arrays, variables, or numerical structures may be equally suitable and are within the contemplation of those skilled in the art. In one approach, each entry in each array is the intensity of the pixel at the given row and column. Further, in one aspect, seven regions are defined by the process, while contours are not explicitly used. No contours explicitly exist in the exemplary process because of the deltaLength calculation and all necessary information for the deltaLength calculations can be determined from knowing the regions to which the neighboring pixels belong. Therefore, no explicit contour representation is required. It will be appreciated that in other approaches, another number of regions may be used. The processed image $u_1$ in this embodiment is an approximation to the original image in which pixels belonging to the same region all have the same or substantially similar intensities.

A plurality of arrays is defined to process original image $u_0$ for eventual conversion into processed image $u_1$. For example, in one embodiment, the following arrays may be used in the processing of each image:
rgnMap
lenMap
numEls
totalIntensity, and
averageIntensity where the array rgnMap is indexed by row and column. In this illustration, each entry in the array rgnMap is the region number of the pixel at the given row and column. The array lenMap is also indexed by row and column, with each entry in the array lenMap being the number of immediate neighbors of the pixel at the given row and column that belong to a different region. This quantity is used in length calculations. The array numEls is indexed by region. Each entry in the array numEls is the number of pixels in the given region. The array totalIntensity is indexed by region. Each entry in the array totalIntensity is the sum of intensities of the pixels in the given region. The array averageIntensity is indexed by region. Each entry in the array averageIntensity is the average intensity of the pixels in the given region. As before, the specific selection of arrays and indices, and the numerical and textual descriptors therefore, are application dependent may vary without departing from the spirit and scope of the present disclosure.

As noted above, in this example pixels belonging: to the same region all have the same or similar intensities. At initialization, prior to any processing, pixels defining a region may not in fact be spatially proximate or contiguous. For this reason, regions at the outset may also be considered groupings, which become more like contiguous regions as a result of the processing steps described below. After several iterations, a single region could still consist of pixels from physically separate portions of the image. FIG. 2 is an example of this, where the three identified objects all belong to the same region. Thus, in a noisy image such as FIG. 2, the initialization may very well result in many spatially separate sections, which may only consists of one or a few pixels. It is the length term that tends to define a region more by spatially proximate pixels, and the fit term that tends to make the pixels within a region more homogeneous. Ultimately, the regions created as part of the initialization will evolve over one or more iterations to balance, for each region, the minimization of the length of the region boundary and the homogeneity of pixels within the region.

Figure 4:
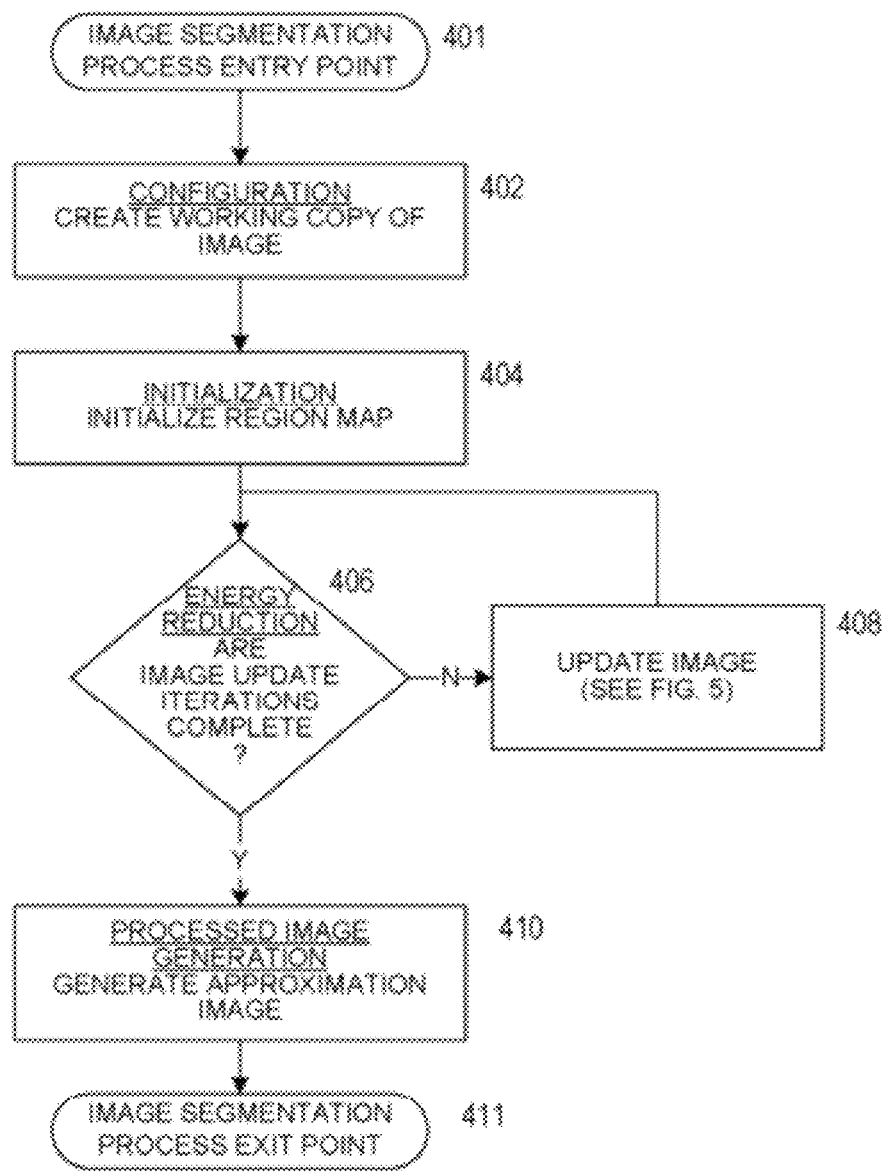
FIG. 4 is a flow diagram illustrating a region-based image segmentation approach using image mapping.

FIG. 4 illustrates four general processing steps that may be executed in an exemplary image segmentation process 400 according to an aspect of the present disclosure: a configuration step 402, an Initialization step 404, an energy reduction step 406, and a processed image generation step 408.

Point 401 marks the image segmentation process 400 entry point. The configuration step 402 configures the arrays of rgnMap, lenMap, and numEls. In one approach, the array rgnMap is initially configured by first being divided by the range of intensities contained in the original image into a plurality of equally spaced intervals, one for each possible region. In the example described herein, there are seven (7) intervals, or regions. Each pixel is initially assigned to a region corresponding to the interval that contains the pixel's intensity by setting the pixel's corresponding entry in rgnMap to the region number.

Now that each pixel's region number is known, the number of immediate neighbors of a pixel at any given row and column that belong to a different region (lenMap) can also be determined. So too can the number of pixels in a given region (numEls). Accordingly, the arrays lenMap and numEls are then initialized from the information contained in rgnMap.

While the pixel-based characteristic of intensity, which is a scalar representation, is used in this embodiment to demarcate regions, other scalar or vector representations may also be used. Example representations may include color or some other parameterized function, such as a Fourier or wavelet transformation. These transformations may be associated with texture, spectral measurements, or other image characteristics, and would represent some preprocessing stage to the region-based segmentation process described herein.

The number of regions used in the image segmentation process 400 may be arbitrary. Segmentation is closely correlated with individual pixel intensities. Thus, in contrast to a conventional process that begins by defining an arbitrary boundary of a region that has no real connection to actual pixel intensities, the exemplary approach described herein effectively performs an initial segmentation before the core part of the algorithm is executed. In conventional approaches, the number of regions may be selected based on some preprocessing of the image, or based on some application or prior data. For example, the number of desired regions may be associated with some set of intensity ranges that fit within the dynamic range of the images to be processed. Or, the number of regions may be limited or tuned based on an a priori knowledge of the types of images that are going to be processed such that the approximation images tend to associate fewer regions with grosser objects instead of more regions with finer sub-object details. The choice of seven regions for the example described herein is arbitrary, but provides a number of regions that can be reasonably compared to corresponding outputs of the ACWE approach using two and three contours (i.e. 4 and 8 regions).

The initialization step 404 initializes the arrays totalIntensity and averageIntensity from the information in the original image and the arrays rgnMap and numEls. As discussed above, each entry in the averageIntensity array is the average intensity value for a region based on the intensities of all pixels assigned to that region. Further, each entry in the totalIntensity array is a total intensity of all pixels assigned to a particular region.

The energy reduction step 406 may perform a fixed number of image update iterations. In one approach, three iterations are performed. However, the number of iterations to be performed need not be predetermined, and fewer or greater than three iterations may be performed. In one embodiment as part of the energy reduction step 406, the implementation first determines whether the image update iterations are complete. If not, an update image is generated (step 408) as explained in greater detail with reference to FIG. 5. In general, in rendering an updated image in step 408 for each iteration, the implementation modifies the regions by changing the array rgnMap (i.e., by changing, as appropriate, the region numbers of pixels in the image) in order to reduce the value of an objective function, referred to as an energy function, as described below. An upper bound on the number of iterations may be based on the ability of the last iteration to reduce a value of the objective function. However, the number of iterations may be limited based on a review of the image. After rgnMap has been modified, the other arrays are updated accordingly, and the image is updated.

If the implementation instead determines that the iterations are complete (step 407), then an approximation image is generated (410), which represents the processed image $u_1$, and the implementation is complete. The image segmentation process exit point (411) is reached.

Figure 5:
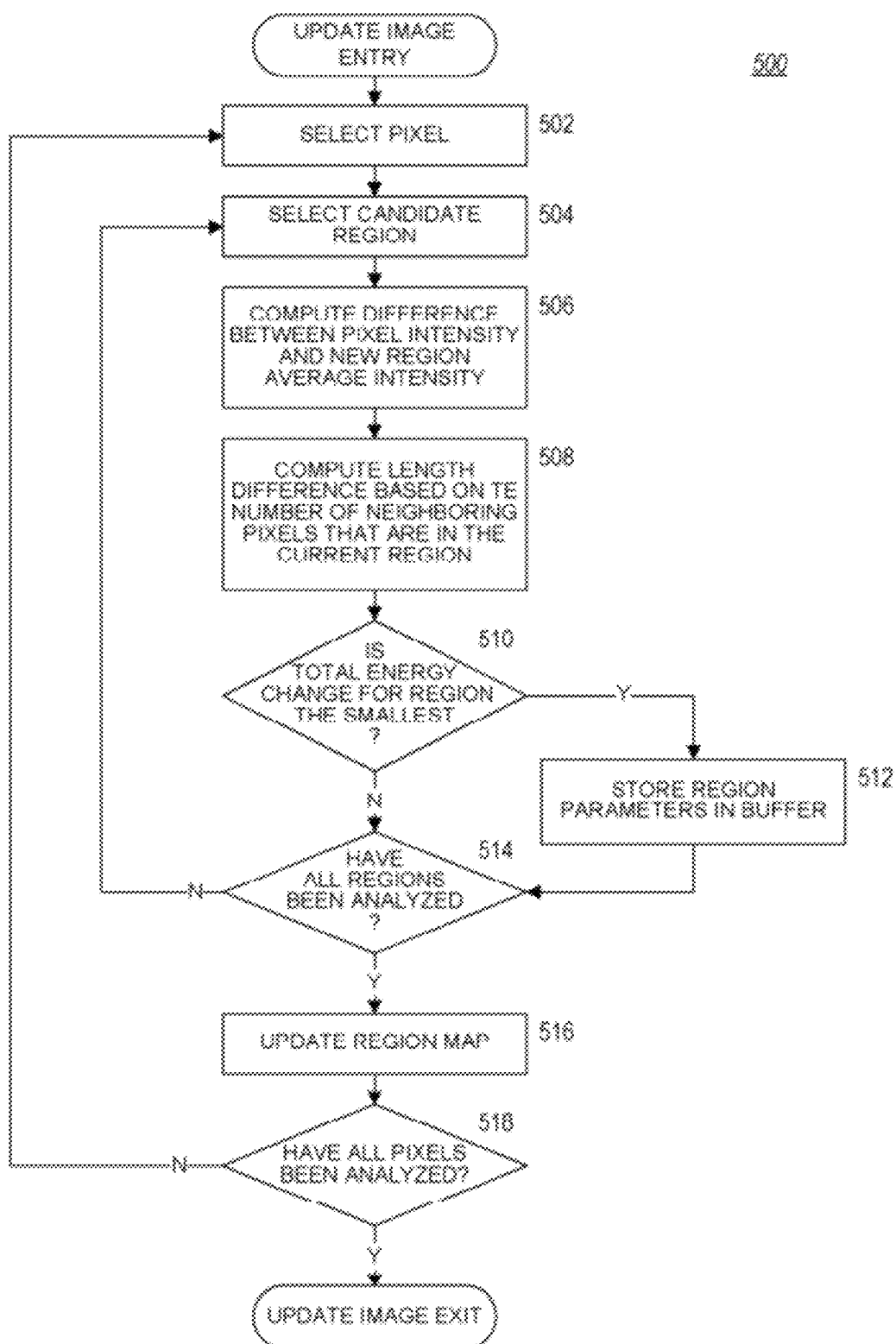
FIG. 5 is a flow diagram illustrating an image update process portion of the region-based image segmentation process of FIG. 4.

FIG. 5 illustrates an exemplary image update process 500 (see step 408 in FIG. 4) in which the image is updated based on an energy function. In one aspect, the exemplary image update process 500 attempts to homogenize each region by associating each pixel with a particular region such that the total level of energy for the image based on the pixel located in that region is minimized with respect to an energy function.

In one aspect, the energy function has two terms, a fit term and a length term. A function for calculating a change in energy in the image that is used to determine if a pixel should be moved from its currently assigned region to a new region is a weighted sum of the changes in the two terms:

$$\text{deltaEnergy} = \text{deltaFit} + (w \cdot \text{deltaLength}), \tag{1.2}$$

where the weight coefficient w is a predetermined value that may be specified by the user. In one aspect, the weight coefficient may be dependent on the dynamic range of the images to be processed, where the weight coefficient is proportional to the dynamic range of the data in the data set and influenced by the equation in which the coefficient is used. Without the weight coefficient, the magnitude of the deltaLength value may be too large as compared to the deltaFit value, thereby rendering the deltaFit component of the evaluation insignificant; or too small, thereby rendering the deltaLength component of the evaluation ineffectual. In other embodiments, the weight coefficient, if necessary, may be determined by additional or alternative factors.

In step 502, a pixel is selected for processing. The region in which the pixel is located is identified in a variable curRegion. Then, a region that may be a candidate region into which the pixel selected in step 502 will be moved is selected in step 504. The candidate region is identified in a variable newRegion. Since all the regions are considered, including leaving the pixel in the region in which it currently resides, there is no specific order in which the candidate regions are selected.

In step 506, deltaFit, which is a difference between the selected pixel's intensity and the candidate region's average intensity, is calculated. For example, suppose that the pixel selected in step 502 is in row r and column c. The change in the fit term is:

$$\text{deltaFit} = abs(u0[r][c] - \text{averageIntensity}[\text{newRegion}]). \tag{1.3}$$

The term deltaFit in this aspect involves the absolute value (not the square) of deviations from region averages, and it does not involve ratios of region pixel counts. Accordingly, unlike the copious calculations involving repetitive squares and ratios characteristics of conventional approaches heretofore described, the method according to the present embodiment streamlines the energy reduction computation by obviating, in one embodiment these floating-point intensive computations. The result is a substantial savings in computational resources and processing time.

In step 508, a length difference is computed. The change in the length term is:

$$\text{deltaLength} = \text{newLen} - \text{lenMap}[r][c], \tag{1.4}$$

where newLen is the number of immediate neighbors of the pixel at the given row and column that are not in newRegion, and lenMap [r] [c] is the number of immediate neighbors of the pixel that are not in curRegion. It should be noted that the identification of current region does not change throughout this iteration. In this embodiment, the term deltaLength does not require processor intensive computations involving the square roots of sums of squares. Further, in this embodiment deltaLength does not depend on the number of contours. Instead, the equation is determined based on an analysis of segments of the perimeter being determined for each region.

In step 510, a determination is made as to which region parameters to store based on equation (1.2) and the computations of deltaFit and deltaLength from equations (1.3) and (1.4), respectively. In one aspect, it is determined whether the total energy change for the chosen region is the smallest. If so, then operation continues with step 512. Otherwise, operation continues with step 514. In other embodiments depending on the application, the characteristics used, etc., other determining criteria may be suitable in step 510. For example, it would be possible to use some other objective function other than minimizing deltaEnergy, but it would likely be more complex.

In step 512, the region parameters for the candidate region, newRegion, may be stored in a memory buffer. In one aspect, this region has been determined to be the region to which the selected pixel will be reassigned if no other regions are found to have a better deltaEnergy result (in the context of the specific determining criteria being used) as determined in step 510. These parameters may include the total number of pixels in the region, the average intensity of all pixels in the region, the total (i.e., sum) of the intensities of all pixels in the region, and other criteria. The stored parameters may be calculated based on the assumption that the selected pixel has been moved to the candidate region. By storing the parameters as in step 512, no redundant calculation will need to be performed for them in later portions of the process, as discussed below.

In step 514, it is determined if all regions have been analyzed. If not, then operation returns to step 504, where another region is selected. Otherwise, operation continues with step 516.

In step 516, rgnMap, the region map, is updated if it is necessary to reassign the selected pixel to the region. Since rgnMap is indexed by pixel coordinates, the new region number is assigned to the pixel index in rgnMap. If no reassignment of the pixel is necessary, then no update is required. The update is also based on the values of the region parameters stored in 512. It should be noted that in this approach, because the relevant calculations have been performed in the previous steps with the assumption that the pixel is already associated with the region to which it is being moved, there is no need to recompute the parameters for the regions that are affected, as is done in the prior approaches. Thus, in the exemplary approach, only a simple assignment update is required.

In step 518, it is determined whether all pixels have been analyzed. If not, then operation returns to step 504, where another pixel is selected. Otherwise, the exemplary process 500 is completed, and operation continues with step 408 (see FIG. 4).

Referring back to FIG. 4, a processed image generation step 410 uses rgnMap and averageIntensity to construct the approximation image by assigning all pixels that belong to a given region number, as identified in rgnMap, with the corresponding intensity from averageIntensity for that region number. The approximation image is in one configuration the processed image $u_1$. The approximation image generally consists of fewer intensity levels, which may result visually in less noise or variation, and may produce a visual effect similar to a contrast enhancement of the different regions.

Figure 7:
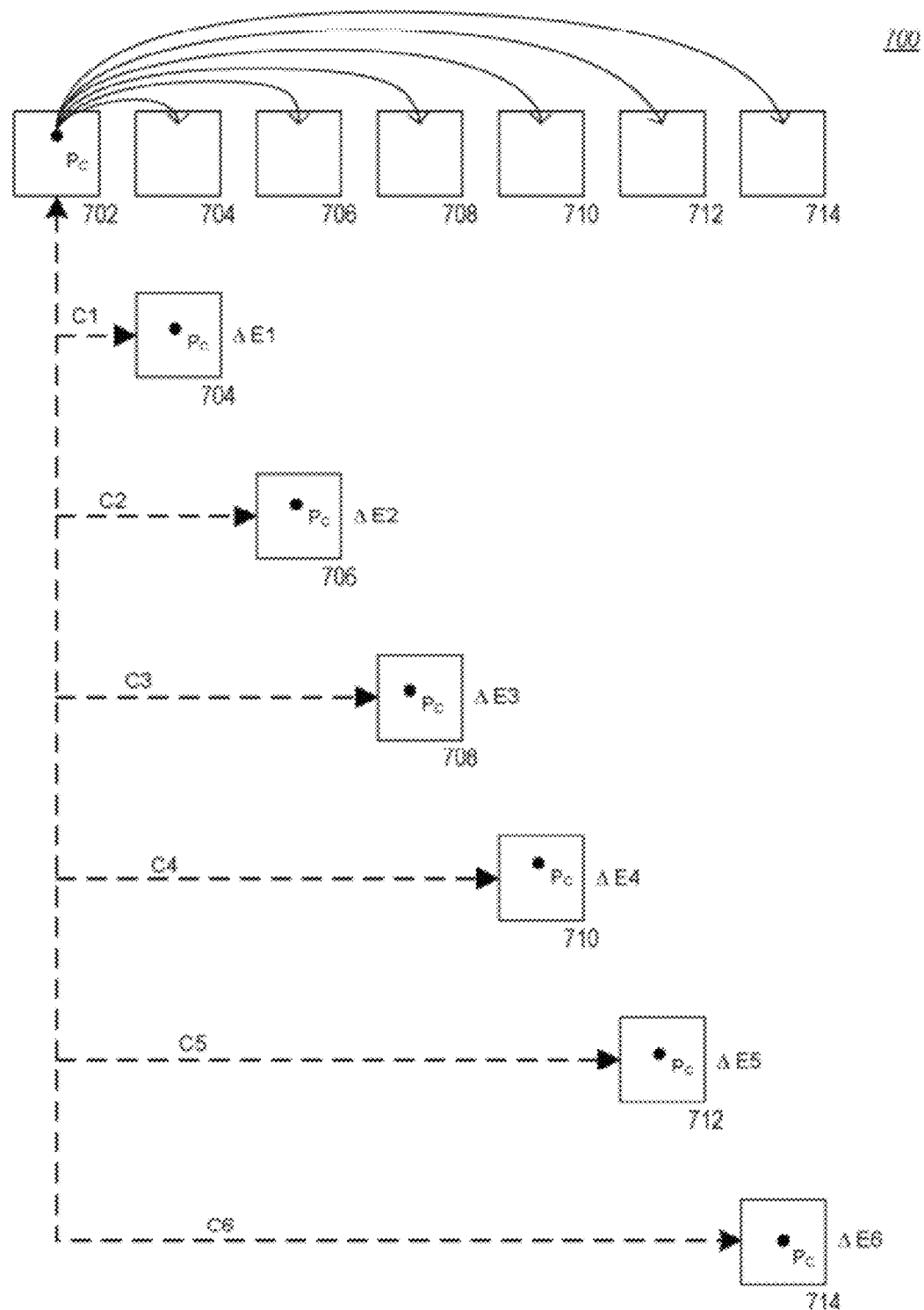
FIG. 7 is a conceptual diagram of an exemplary method of measuring energy levels of an image based on locating pixels in different regions.

FIG. 7 is a conceptual diagram of an exemplary method of measuring energy levels of an image based on pixels in different regions, such as illustrated in steps 502-518 of FIG. 5. An image is partitioned into a predetermined number of—in this case seven regions based on intensity. Conceptually, these regions will be referred to as groups 702, 704, 706, 708, 710, 712 and 714. While these groups of pixels are shown as being placed into "buckets" for simplicity, the actual regions formed by the pixels in practice may comprise any shape and may be located in a variety of locations on the image. These regions may be disjointed, as discussed above. During the course of iterating through the exemplary image segmentation process described herein, the region boundaries evolve, which may result in the reassignment of pixels to one of the seven regions in accordance with equations (1.3) and (1.4), above.

In this example, the energy level of the image that is based on the assignment of the pixel $P_C$ to the current group 702 is first compared to the energy level of the image based on a supposed assignment of the same pixel to a new group 704 using logical branch C1. A change in energy $\Delta E1$ of the image is calculated and stored in memory. Next, using logical branch C2, the energy level of the image that is based on the assignment of the pixel $P_C$ is compared with the energy level of the image based on a supposed assignment of the same pixel to a new group 706 using logical branch C2.

A change in energy $\Delta E1$ of the image is calculated. In one aspect, if $\Delta E1 < \Delta E2$, than $\Delta E2$ may be discarded and control moves to logical branch C3. Comparison is now made for the energy level of the image of the image base on a supposed assignment of the same pixel to a new group 708. However, if $\Delta E1 > \Delta E2$, then $\Delta E2$ is stored in memory and $\Delta E1$ may be discarded. The process may continue until all the energy levels of the image based on a supposed assignment of the pixel to each of the six groups have been compared with the energy level of the image based on the current assignment of the pixel to the current group. The end result in this example is the lowest change in energy (say, $\Delta E2$) of the image may indicate the correct region to which the pixel belongs based on this iteration. Thereupon, a new pixel is selected, where the process starts again for the selected pixel. In some approaches, the process for each image may be repeated more than one time (e.g., three or more) to provide a more accurate indication of each pixel's location. Then, a processed image $u_1$ can be produced.

The exemplary process addresses issues raised by the prior approaches, such as the AWCE, and utilizes approximations to increase execution efficiency of the process without reducing the effectiveness of the implementation. Consequently, the exemplary process reduces overall execution time by achieving several points of efficiency.

For example, while prior approaches use both regions and contours, the exemplary implementation does not require the use of contours. By eliminating the need to use contours, the exemplary implementation substantially simplifies computations while still maintaining substantially the same precision and accuracy of the end result. As a specific example, eliminating the use of contours eliminates the need to determine the relative position of each pixel in an image with respect to a contour (i.e., the need to determine whether each pixel is inside or outside or a contour).

In addition, the exemplary implementation according to one aspect adapts the initialization of the regions to the original image based on the characteristics of the image. For example, each pixel is assigned to the region corresponding to an interval containing the pixel's intensity. This approach is more efficient than using an arbitrarily fixed contour initialization while also providing the image segmentation process a low computational cost jumpstart that, in one embodiment, is worth approximately one iteration.

Moreover, the exemplary implementation stores relevant data when it is calculated rather than recalculating it whenever it is needed. For example, in another aspect described above, the exemplary implementation saves the association between a pixel and its region in the array rgnMap whenever its region changes. This change eliminates frequent recalculations.

In yet another aspect, the exemplary implementation replaces the more computationally intensive deltaFit and deltaLength calculations with novel approximations. Specifically, the exemplary implementation's deltaFit approximation calculates only the absolute value of the deviation of a pixel's intensity from the region's average intensity, while the prior implementation's deltaFit calculation involves not only squares of deviations but also ratios of region pixel counts.

Moreover, the exemplary implementation omits from the deltaFit calculation the absolute value of the deviation of the pixel's intensity from the current region's average intensity, because it does not affect the minimization. Normally, approximations do not perform as well from a results perspective. However, the novel aspects to the image processing approach disclosed herein to the deltaFit calculation provides good image results, for several reasons. For example, it is natural to expect that the results would be sensitive to any approximation in this portion of the calculation because it is one of the important parts of the process. In addition, the approximation considers the deviation from the region's current average intensity rather than the deviation from the region's new average after the pixel has been included in the region, as in the exact calculation. Further, the approximation uses sums of absolute values of deviations rather than sums of squares of deviations, as in the exact calculation; in general, this would not be a good approximation. Nevertheless, the image results are of good quality.

Further, the exemplary implementation's deltaLength approximation calculates only the difference of the number of immediate neighbors of the pixel that do not belong to the new region and the current region, while the prior implementation's calculation involves square roots of sums of squares and depends on the number of contours. Both the exemplary implementation and the prior implementation calculate deltaLength by using only data involving the immediate neighbors of the pixel, but it was unexpected that the exemplary implementation achieves good image results, for multiple reasons. For example, it replaces the prior implementation's exact distance calculations with simple counts. Although not obvious, this approximation is actually proportional to the exact distance because all line segments between pixels have the same length. Also, the approach allowed by the approximation does not explicitly require the accounting of the number of contours.

Figure 6:
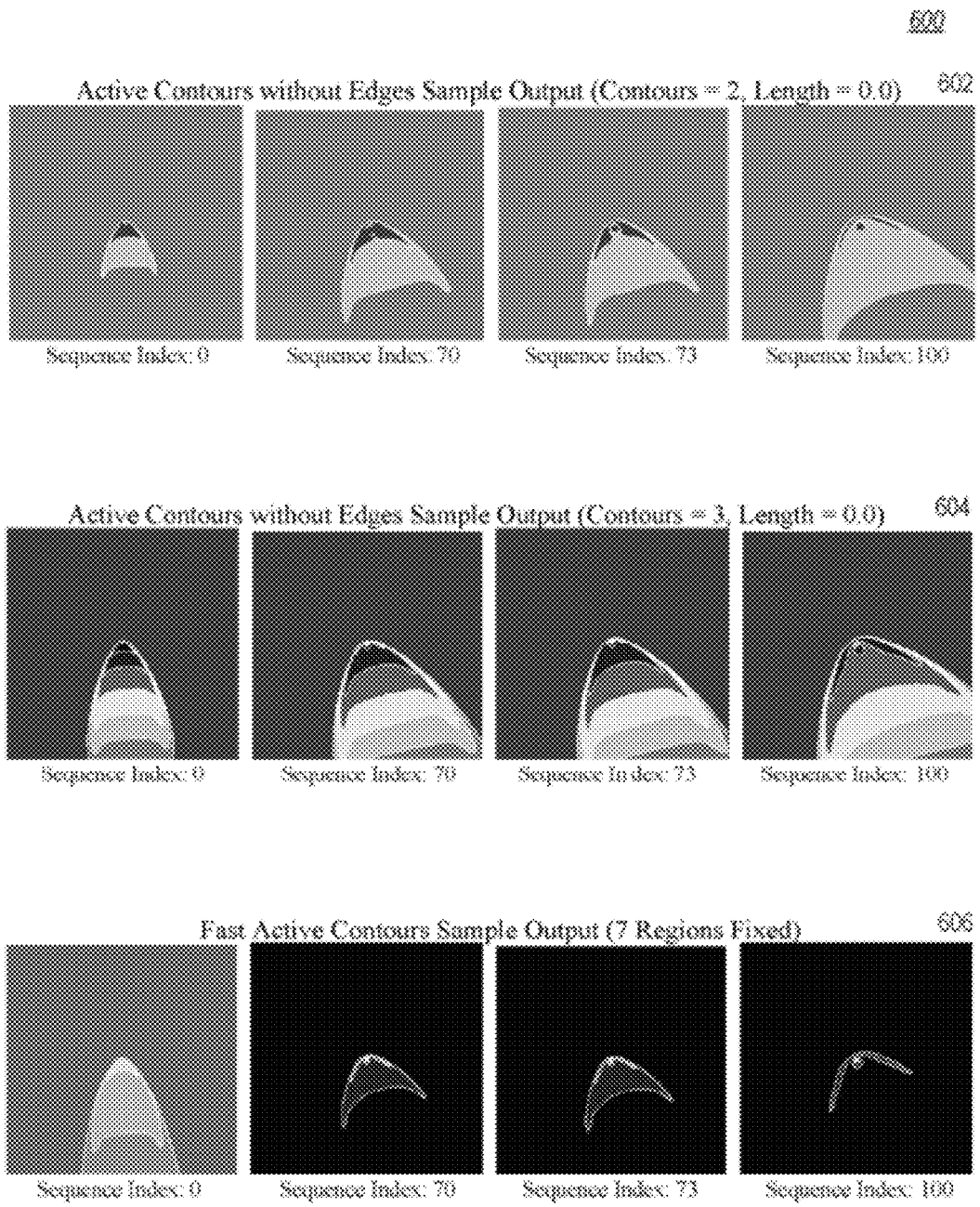
FIG. 6 contains three sets of sample outputs comparing the performance of the ACWE segmentation approach using two and three contours with the region-based segmentation approach using region mapping.

The exemplary implementation has much shorter execution time than prior implementations, yet achieves substantially equally good image segmentation. For comparison purposes, a comparison 600 of three sets of sample outputs 602, 604 and 606 are provided in FIG. 6 to illustrate how the exemplary implementation, i.e., the functioning of the fast region-based segmentation using region mapping method, compares to the conventional ACWE method. The first two sets 602 and 604 are two variations of the ACWE method, referred to as baseline algorithms, illustrating how different numbers of contours affect the segmentation results. The third set 606 illustrates a sample segmentation output of the fast region-based segmentation where the sequence index indicates the position of each image in a succession of images in a sequence. It should be noted that FIG. 6 only illustrates the end result of segmentation on different images, not evolutions of the segmentation process on the same image as was shown in the other figures.

The single image segmentation processing speeds for various image sizes are shown below in Table 1 for both the baseline algorithm and the fast algorithm. The advantage of the exemplary implementation is that it improves execution times as compared to the prior implementation, while achieving similar image segmentation results. For example, on a set of test images, the exemplary implementation's average execution time was only 0.015 second, while the prior implementation's average execution time was 0.27 seconds. This represents more than an order of magnitude of speedup in the exemplary implementation.

TABLE 1

Comparison of Single Image Segmentation Processing Speeds

| Image Size (Pixels) | Baseline Algorithm | Fast Algorithm | Typical Improvement |
| --- | --- | --- | --- |
| 512 × 512 | 1 | 0.09 | 91% |
| 256 × 256 | 0.27 | 0.015 | 94% |

Figure 8:
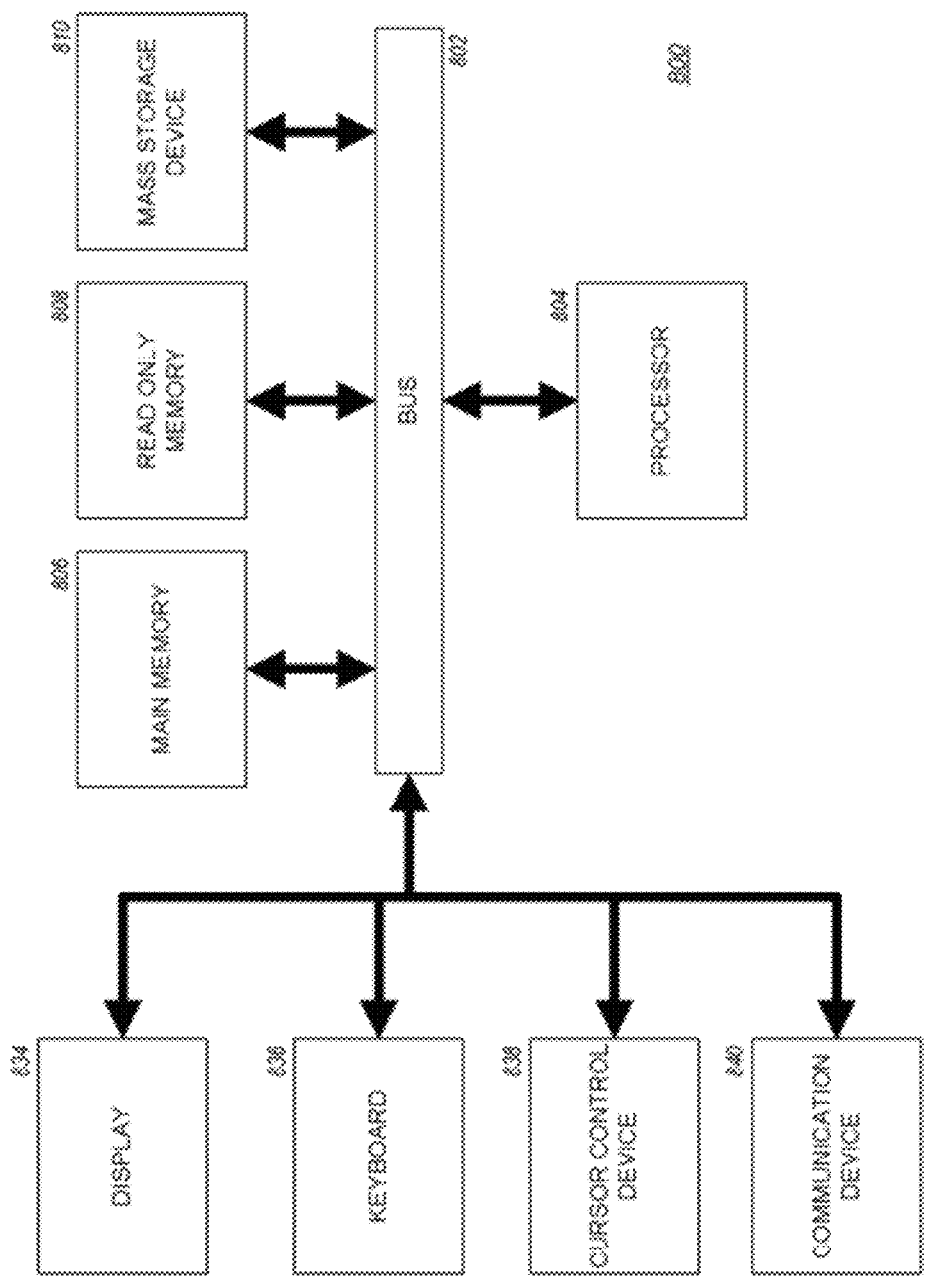
FIG. 8 is a block diagram of a computer system configured in accordance with one approach of the customer interaction recapture system.

FIG. 8 illustrates an example of a computer system 800 in which the features of the present disclosure may be implemented. The computer system 800 includes a bus 802 for communicating information between the components in the computer system 800, and a processor 804 coupled with the bus 802 for executing software code, or instructions, and processing information. The computer system 800 further comprises a main memory 806, which may be implemented using random access memory (RAM) and/or other random memory storage device, coupled to the bus 802 for storing information and instructions to be executed by the processor 804 to perform the image segmentation process. The main memory 806 also may be used for storing temporary variables or other intermediate information during execution of instructions by the processor 804, such as the region with the lowest detected: energy of the image as compared to the other regions as well as the various variables disclosed herein. The computer system 800 also includes a read only memory (RO) 808 and/or other static storage device coupled to the bus 802 for storing static information and instructions for the processor 804.

Further, a mass storage device 810, such as a magnetic disk drive and/or a optical disk drive, may be coupled to the computer system 800 for storing information and instructions. The computer system 800 can also be coupled via the bus 802 to a display device 834, such as a cathode ray tube (CRT) or a liquid crystal display (LCD), for displaying information to a user so that, for example, graphical or textual information may be presented to the user on the display device 834. Typically, an alphanumeric input device 836, including alphanumeric and other keys, is coupled to the bus 802 for communicating information and/or user commands to the processor 804. Another type of user input device shown in the figure is a cursor control device 838, such as a conventional mouse, touch mouse, trackball, track pad or other type of cursor direction key for communicating direction information and command selection to the processor 804 and for controlling movement of a cursor on the display 834. Various types of input devices, including, but not limited to, the input devices described herein unless otherwise noted, allow the user to provide command or input to the computer system 800. For example, in the various descriptions contained herein, reference may be made to a user "selecting," "clicking," or "inputting," and any grammatical variations thereof, one or more items in a user interface. These should be understood to mean that the user is using one or more input devices to accomplish the input. Although not illustrated, the computer system 800 may optionally include such devices as a video camera to capture images to be processed, speakers, a sound card, or many other conventional computer peripheral options.

A communication device 840 is also coupled to the bus 802 for accessing other computer systems, as described below. The communication device 840 may include a modem, a network interface card, or other well-known interface devices, such as those used for interfacing with Ethernet, Token-ring, or other types of networks. In this manner, computer system 800 may be coupled to a number of other computer systems to obtain data such as images to be processed, as well as transmit data such as the processed images.

The fast region-based segmentation using region maps as embodied in the exemplary implementation can be applied to virtually any type of image segmentation problem. For example, it is applicable to applications including object detection and tracking applications for image sensor networks, as well as applications in medical imaging such as tumor detection and tracking. The segmentation approach is also suitable for surveillance imaging applications. The segmentation approach would directly support classification and identification processes for imaging applications that classify or identify regions of an image.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The teachings herein may be incorporated into (e.g., implemented within or performed by) a variety of apparatuses (e.g., devices). Accordingly, one or more aspects taught herein may be incorporated into a computer (e.g., a laptop), a portable communication device, an image processing system (e.g., a radar or photo image processing system), a portable computing device (e.g., a personal data assistant), a phone (e.g., a cellular phone or smart phone), a global positioning system device, or any other suitable device that is configured to perform image processing.

The various illustrative logical blocks, modules, and circuits described in connection with the aspects disclosed herein may be implemented within or performed by an integrated circuit ("IC"), an access terminal, or an access point. The IC may comprise a general purpose processor; a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If the process depicted in FIGS. 4 and 5, and described in this disclosure is implemented in software, any known programming language may be used, including, for example, C, C++, Java, Visual Basic, as well as scripting languages such as JavaScript, VBScript, and others. The code may be in compiled or uncompiled form, and may be written in discrete blocks or as a single program.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the present disclosure. Thus, the present disclosure is not intended to be limited to the aspects shown herein but is to be accorded the widest scope consistent with the principles and novel features disclosed herein.

What is claimed is:

1. A method of object detection in an image comprising a plurality of pixels by image segmentation comprising:
   dividing the image into a plurality of regions;
   assigning each pixel to one of the plurality of regions based on a characteristic;
   performing an energy reduction on the image based on a region reassignment of at least one pixel and a comparison based on regions to which pixels surrounding the at least one pixel are assigned, wherein reducing the energy of the image comprises:
   a) selecting a candidate pixel;
   b) determining a change in energy of the image comprising a difference in energy of the image based on a movement of the candidate pixel from a current location in a current region to a new location in a new region, wherein determining the change in energy comprises:
     i) determining a plurality of energy levels for the image, wherein each energy level is determined as if the candidate pixel has already been assigned to a different region, and wherein the energy level comprises a sum of a plurality of region energies, with each region energy comprising a weighted sum of the intensity of the region and a length of at least a portion of a perimeter of the region; and
     ii) identifying the new region as being one with a lowest energy level in the plurality of energy levels; and c) reassigning the candidate pixel to the new region if there is a decrease in energy of the image; and producing an output image based on the energy reduction.

2. The method of claim 1, wherein the characteristic is related to an intensity level of each region.

3. The method of claim 1, wherein the characteristic is related to at least one of an intensity level of each region and an intensity level of each pixel.

4. The method of claim 1, wherein determining the change in energy comprises:

determining a current energy level of the image based on the current location of the candidate pixel in the current region;

determining a new energy level of the image based on the new location of the candidate pixel in the new region; and determining a difference between the current energy level and the new energy level.

5. The method of claim 1, wherein the candidate pixel comprises an intensity level, and wherein the energy level comprises a sum of a plurality of region energies, with each region energy comprising a deviation of the intensity level of the candidate pixel from an average intensity level of the region.

6. The method of claim 1, wherein the candidate pixel is surrounded by neighboring pixels, and wherein the energy level is based on a boundary based on an assignment of the neighboring pixels to the current region and the new regions, respectively.

7. The method of claim 1, wherein reducing the energy of the image comprises achieving a more homogenous distribution of a range of the characteristic for each region.

8. The method of claim 7, wherein achieving a more homogenous distribution of the range of the characteristic for each region comprises achieving a more even distribution of intensities of pixels assigned to the region.

9. An apparatus for object detection in an image comprising a plurality of pixels by image segmentation comprising:

means for dividing the image into a plurality of regions;

means for assigning each pixel to one of the plurality of regions based on a characteristic;

means for performing an energy reduction on the image based on a region reassignment of at least one pixel and a comparison based on regions to which pixels surrounding the at least one pixel are assigned, wherein the means for reducing the energy of the image comprises:

a) means for selecting a candidate pixel;

b) means for determining a change in energy of the image comprising a difference in energy of the image based on a movement of the candidate pixel from a current location in a current region to a new location in a new region, wherein the means for determining the change in energy comprises:

i) means for determining a plurality of energy levels for the image, wherein each energy level is determined as if the candidate pixel has already been assigned to a different region, and wherein the energy level comprises a sum of a plurality of region energies, with each region energy comprising a weighted sum of the intensity of the region and a length of at least a portion of a perimeter of the region; and ii) means for identifying the new region as being one with a lowest energy level in the plurality of energy levels; and c) means for reassigning the candidate pixel to the new region if there is a decrease in energy of the image; and means for producing an output image based on the energy reduction.

10. The apparatus of claim 9, wherein the characteristic is related to at least one of an intensity level of each region and an intensity level of each pixel.

11. The apparatus of claim 9, wherein the means for determining the change in energy comprises:

means for determining a current energy level of the image based on the current location of the candidate pixel in the current region;

means for determining a new energy level of the image based on the new location of the candidate pixel in the new region;

means for determining a difference between the current energy level and the new energy level.

12. The apparatus of claim 9, wherein the candidate pixel comprises an intensity level, and wherein the energy level comprises a sum of a plurality of region energies, with each region energy comprising a deviation of the intensity level of the candidate pixel from an average intensity level of the region.

13. The apparatus of claim 9, wherein the candidate pixel is surrounded by neighboring pixels, and wherein the energy level is based on a boundary based on an assignment of the neighboring pixels to the current region and the new regions, respectively.

14. The apparatus of claim 9, wherein the means for reducing the energy of the image comprises means for achieving a more homogenous distribution of a range of the characteristic for each region.

15. The apparatus of claim 14, wherein the means for achieving a more homogenous distribution of the range of the characteristic for each region comprises means for achieving a more even distribution of intensities of pixels assigned to the region.

16. A computer program product for object detection in an image comprising a plurality of pixels by image segmentation comprising:

a non-transitory computer readable medium comprising codes executable to:

divide the image into a plurality of regions;

assign each pixel to one of the plurality of regions based on a characteristic;

perform an energy reduction on the image based on a region reassignment of at least one pixel and a comparison based on regions to which pixels surrounding the at least one pixel are assigned, wherein the codes executable to reduce the energy of the image comprises codes executable to:

a) select a candidate pixel;

b) determine a change in energy of the image comprising a difference in energy of the image based on a movement of the candidate pixel from a current location in a current region to a new location in a new region, wherein the codes executable to determine the change in energy comprises codes executable to:

i) determine a plurality of energy levels for the image, wherein each energy level is determined as if the candidate pixel has already been assigned to a different region, and wherein the energy level comprises a sum of a plurality of region energies, with each region energy comprising a weighted sum of the intensity of the region and a length of at least a portion of a perimeter of the region; and ii) identify the new region as being one with a lowest energy level in the plurality of energy levels; and c) reassign the candidate pixel to the new region if there is a decrease in energy of the image; and produce an output image based on the energy reduction.

17. The computer program product of claim 16, wherein the characteristic is related to at least one of an intensity level of each region and an intensity level of each pixel.

18. The computer program product of claim 16, wherein the codes executable to determine the change in energy comprise codes executable to:

determine a current energy level of the image based on the current location of the candidate pixel in the current region;

determine a new energy level of the image based on the new location of the candidate pixel in the new region; and determine a difference between the current energy level and the new energy level.

19. The computer program product of claim 16, wherein the candidate pixel comprises an intensity level, and wherein the energy level comprises a sum of a plurality of region energies, with each region energy comprising a deviation of the intensity level of the candidate pixel from an average intensity level of the region.

20. The computer program product of claim 16, wherein the candidate pixel is surrounded by neighboring pixels, and wherein the energy level is based on a boundary based on an assignment of the neighboring pixels to the current region and the new regions, respectively.

21. The computer program product of claim 16, wherein the codes executable to reduce the energy of the image comprise codes executable to achieve a more homogenous distribution of a range of the characteristic for each region.

22. The computer program product of claim 21, wherein the codes executable to achieve a more homogenous distribution of the range of the characteristic for each region comprise codes executable to achieve a more even distribution of intensities of pixels assigned to the region.

23. The method of claim 6, wherein the energy level comprises an approximation based on a length of the boundary local to the candidate pixel.

24. The apparatus of claim 13, wherein the energy level comprises an approximation based on a length of the boundary local to the candidate pixel.

25. The computer program product of claim 20, wherein the energy level comprises an approximation based on a length of the boundary local to the candidate pixel.

* * * * *